United States Patent
Ferolito et al.

[11] Patent Number: 5,999,531
[45] Date of Patent: Dec. 7, 1999

[54] METHOD AND SYSTEM FOR IDENTIFYING PORTS AND FORWARDING PACKETS IN A MULTIPORT SWITCH

[75] Inventors: Philip Arnold Ferolito, Sunnyvale; Robert W. Pfile, Palo Alto, both of Calif.

[73] Assignee: Cabletron Systems, Inc., Rochester, N.H.

[21] Appl. No.: 09/062,377

[22] Filed: Apr. 17, 1998

[51] Int. Cl.[6] .................................................. H04J 3/26
[52] U.S. Cl. .......................... 370/390; 370/392; 370/432
[58] Field of Search .................................... 370/390, 392, 370/393, 432, 474, 475

[56] References Cited

U.S. PATENT DOCUMENTS

| | | | |
|---|---|---|---|
| 5,422,881 | 6/1995 | May et al. .................................. | 370/60 |
| 5,434,855 | 7/1995 | Perlman et al. ......................... | 370/60.1 |
| 5,436,893 | 7/1995 | Barnett .................................... | 370/60.1 |
| 5,610,914 | 3/1997 | Yamada ................................... | 370/395 |
| 5,666,361 | 9/1997 | Aznar et al. ............................. | 370/392 |
| 5,689,505 | 11/1997 | Chiussi et al. ......................... | 370/388 |
| 5,689,506 | 11/1997 | Chiussi et al. ......................... | 370/388 |
| 5,872,783 | 2/1999 | Chin ........................................ | 370/392 |

*Primary Examiner*—Melvin Marcelo
*Attorney, Agent, or Firm*—Law Offices of Mark A. Wilson; Mark A. Wilson

[57] ABSTRACT

A method and apparatus for routing packets through a multiport switch involves attaching indicators to packets before the packets are passed through a switch fabric, and then using the indicators to look-up output port vectors after the packets have been passed through the switch fabric. In a preferred embodiment of a 64×64 port switch, an 8-bit output channel vector and a 15-bit output port index are attached to a packet and passed through the switch fabric. The 8-bit output channel vector directs the packet to the proper output packet processor(s) and the 15-bit output port index is used to look-up an output port vector that identifies the output port(s) that will receive the packet. The method and system provide low packet overhead and flexible scaling.

20 Claims, 8 Drawing Sheets

METHOD AND SYSTEM FOR IDENTIFYING PORTS AND FORWARDING PACKETS IN A MULTIPORT SWITCH

TECHNICAL FIELD

The invention relates generally to the forwarding of packets through a high bandwidth multiport switch, such as the type used in gigabit ethernet networks. More particularly, the invention describes an output port identification system that has a low bandwidth consumption and that allows the number of ports in a switch to be easily scaled.

BACKGROUND OF THE INVENTION

Figure 1:
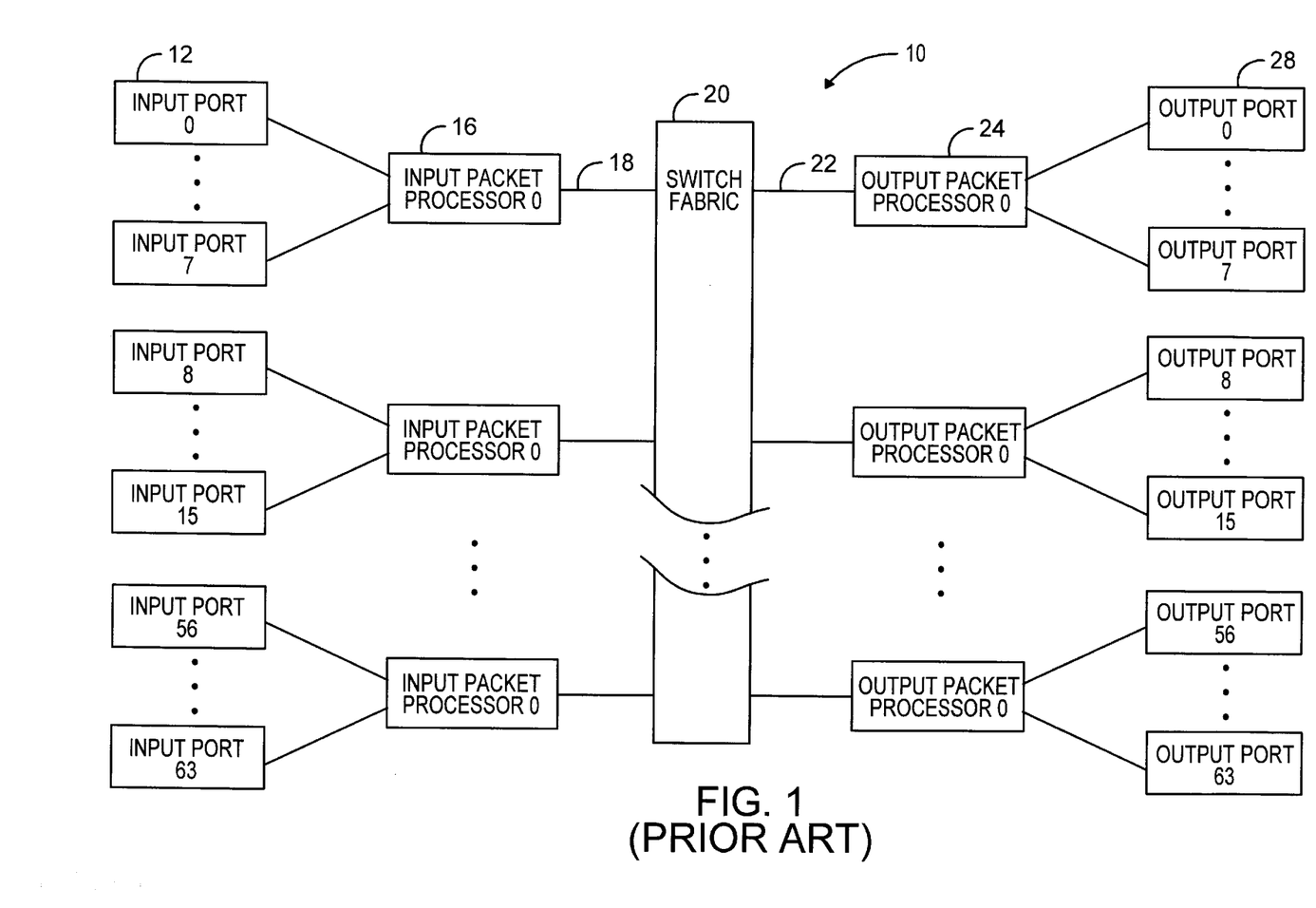
FIG. 1 is a block diagram of the architecture of a 64×64 port switch in accordance with the prior art.

Networks are widely used to transfer voice, video, and data among various network devices such as telephones, televisions, and computers. Switches are utilized to direct network traffic among the various network devices. FIG. 1 is an example of the basic architecture of a 64-port switch 10. The input side of the switch includes sixty-four input ports 12 that are numbered from 0 to 63. The input ports are connected to eight input packet processors (IPPs) 16 that are numbered from 0 to 7. The eight IPPs are connected by eight input channels 18 (numbered 0 through 7) to a switch fabric 20 that provides the connection from input channels to output channels 22. The switch fabric is connected to eight output packet processors (OPPs) 24 that are numbered from 0 to 7 by the eight output channels 22 (numbered 0 through 7). Sixty-four output ports 28, numbered from 0 to 63, are connected to the eight OPPs.

Within the architecture of FIG. 1, the IPPs 16 manage packet traffic incoming to the switch from the input ports 12 and the OPPs 24 manage packet traffic from the switch fabric 20 to the output ports 28. In a conventional switch, a packet arrives at an IPP targeted for transmission to either a single output port, known as a unicast, or to multiple output ports, known as a multicast to selected ports or a broadcast to all of the ports. Header information from the packet is used to generate an output vector that has a width equal to the total number of output ports that are present in the system. For example, in a switch with only eight output ports, packets are forwarded through the switch fabric with an 8-bit (1-byte) output vector, where each bit relates to an output port and a set bit identifies that the corresponding output port is to receive the packet. In a system utilizing ethernet bridges and/or routers, where the minimum packet size is sixty-four bytes, the output vector overhead traveling through the switch fabric of an 8-port switch is only 1 byte/64 bytes, or approximately 1.5%. However, as more output ports are added to a switch, the width of the output vector increases proportionately.

Figure 2:
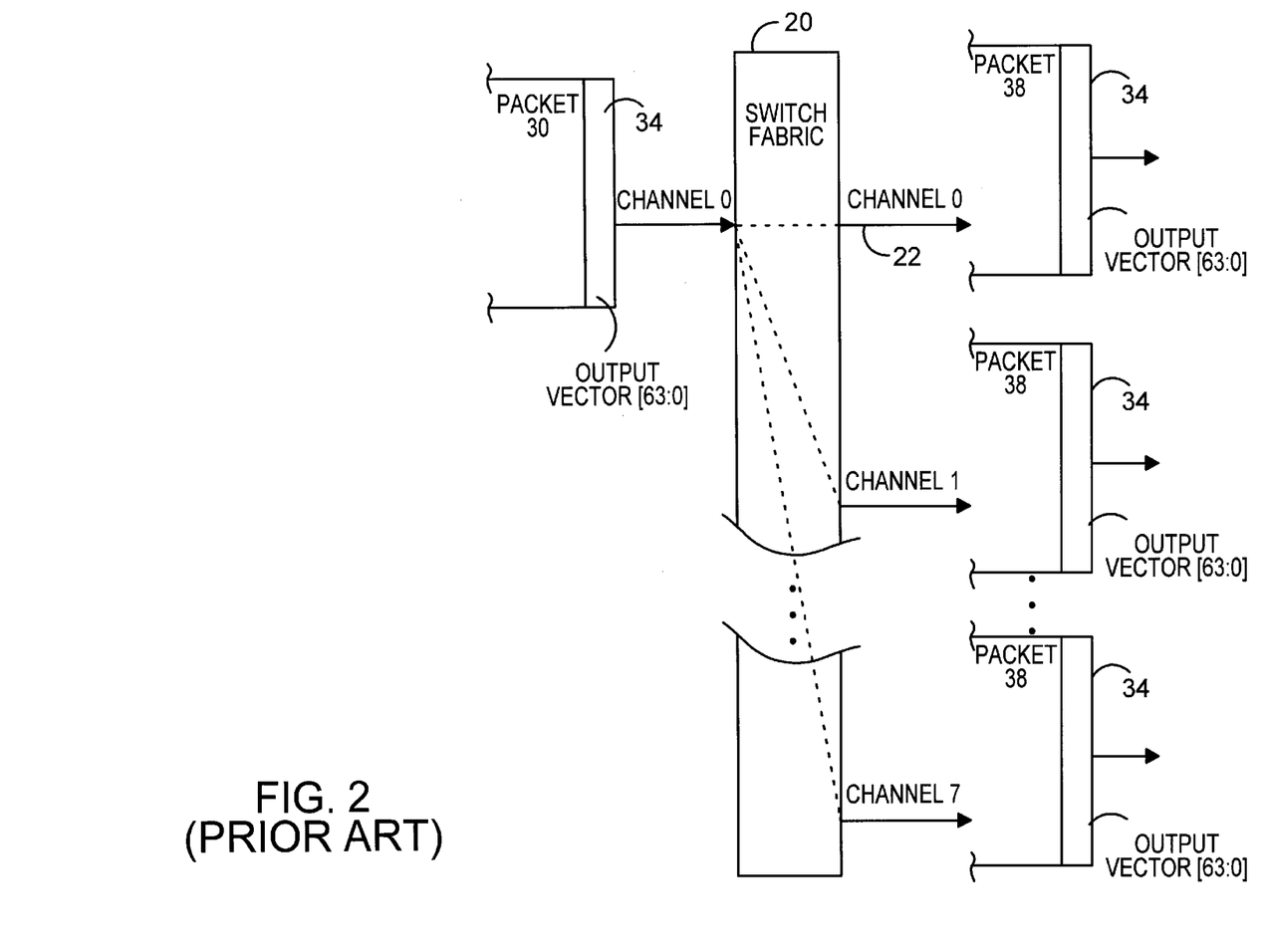
FIG. 2 is a depiction of a packet with a 64-bit output vector that is being forwarded through a switch fabric in accordance with the prior art.

In the 64-port switch architecture of FIG. 1, an output vector of sixty-four bits (eight bytes) is needed to represent all sixty-four output ports 28. FIG. 2 represents an incoming packet 30 with a 64-bit output vector 34 being forwarded through the switch fabric to three output channels (channels 0,1, and 7) and subsequently to the three respective OPPs (not shown). The 64-bit output vector is also transmitted with all three of the outgoing packets 38. From the OPPs, the outgoing packets 38 are distributed to the targeted output ports. The output vector overhead for a minimum size packet forwarded through the switch fabric of FIG. 2 is 8/64 or 12.5%. In a switch with 256 output ports, a 256-bit (32-byte) output vector must be forwarded through the switch fabric. The overhead for a minimum size 64-byte packet is 32/64 or 50%. An exemplary system that attaches an N-bit output vector to a packet passing through an NxN switch is disclosed in U.S. Pat. No. 5,610,914, entitled "Shared Buffer Memory Switch for an ATM Switching System and Broadcasting Control Method," issued to Yamada.

In addition to affecting the size of output vector overhead, the number of output ports in a multiport switch also affects the total number of output port combinations possible for forwarding a single packet. For example, in an 8-port switch there are $2^8$ or 256 possible output port combinations for forwarding a single packet. The increase in output port combinations grows exponentially in relation to the number of output ports by a factor of $2^N$, where N is the number of output ports. The number of output port combinations in 16, 64, 128, and 256 output port switches are 65,536, $1.8 \times 10^{19}$, $3.4 \times 10^{38}$, and $1.2 \times 10^{77}$, respectively. Although the theoretical number of output port combinations is extremely large, the number of output port combinations actually utilized in a typical network is much lower.

While the prior art technique of utilizing an output vector that is equal to the number of output ports works well for its intended purpose, there are some shortcomings. One shortcoming is that whenever the number of output ports is increased, the number of bits in the output vector must also be increased to accommodate identification of the new output ports. Another shortcoming is that each output vector must be transmitted through the switch fabric, inefficiently consuming switch bandwidth.

In light of the observation that a limited number of output combinations are actually utilized in a typical network and the shortcomings associated with a full width output vector, what is needed is a more efficient method and system for identifying output ports that are to receive switched packets and for forwarding packets through a multiport switch.

SUMMARY OF THE INVENTION

The invention is a method and system for identifying ports and forwarding packets in a multiport switch by attaching indicators to packets before the packets pass through a switch fabric, and then using the attached indicators after the packets have passed through the switch fabric to determine which output ports will receive a copy of the packets. In a preferred embodiment, the indicator is an output port index that is forwarded through the switch fabric to specify an output port vector in a look-up table of output vectors. The output port index consumes significantly less switch bandwidth than would the output port vector.

In a preferred method, a packet is received at an input and a determination is made as to which outputs will receive a forwarded packet. The determination is typically based on the contents of a conventional output vector attached to the packet. At the input, the output vector is stripped from the packet and substituted with an indicator that enables subsequent identification of the appropriate output vector stored in the look-up table. With the indicator attached to the packet, the vector-free packet is passed through the switch fabric. Once the combination of the packet and indicator has passed through the switch fabric, the indicator is utilized to look-up the appropriate output vector that represents the output distribution of the packet. Lastly, the identifier is stripped from the packet and the packet is forwarded to all of the outputs that are identified by the output vector.

In an exemplary embodiment, the multiport switch is a 64-port switch with an 8-channel switch fabric. The architecture of the preferred 64x64 switch includes: eight input packet processors each having an output channel vector generator unit and an output port index generator unit; an 8-channel switch fabric; eight output packet processors each having an output port table, an output port table look-up unit, and an output port vector processor unit; and sixty-four output ports.

In the preferred architecture, the input packet processors receive packets from the input ports, buffer packets to accommodate for fluctuations in traffic, and direct packets to the switch fabric. The output channel vector generator units utilize header information from an incoming packet to generate an output channel vector that defines which output channels will receive the incoming packet. The output channel vector may be an 8-bit vector in which the bits correspond on a one-to-one basis to the eight channels in the switch fabric. The output port index generator units utilize header information from the same incoming packet to generate an output port index that allows an output port vector to be identified in a looked-up table stored in the output table look-up unit. In the preferred embodiment, the output port index is a 15-bit vector.

In operation, one of the input packet processors receives an incoming packet and attaches the appropriate output channel vector and the appropriate output port index to the packet. The input packet processor then forwards the packet to the 8×8 channel switch fabric. The switch fabric utilizes the 8-bit output channel vector to forward the packet to all output channels designated by the output channel vector.

The output packet processors on the output channels designated by the 8-bit output channel vector receive the forwarded packet and the 15-bit output port index. The output port table look-up units within the output packet processors then utilize the 15-bit output port index to look-up 8-bit output port vectors in their respective output port tables. The 15-bit output port index can generate $2^{15}$ (or 32,768) different vector combinations and consequently the eight output port tables collectively store a maximum of 32,768 different 64-bit output port vectors that are indexed by their unique 15-bit output port index.

The output port vector processor units then utilize the 64-bit output port vectors obtained from the tables to generate local output port masks for each output port processor. The packets at each output packet processor are then replicated as needed and forwarded to the target output ports based upon the local output port masks.

An advantage of using an output port index to identify an output port vector is that an entire output port vector, for example a 64-bit output port vector, can be identified by forwarding only a 15-bit index through the switch fabric. In contrast, a prior art switch would require that the entire 64-bit output vector be forwarded from the input packet processor across the switch fabric to the output packet processor for each packet transported through the switch. The 64-bit output vector required by the prior art is forty-one bits larger than the 23-bit combined output channel vector and output port index utilized in accordance with the invention. Another advantage of the output port index and the output port table is that the combination provides for flexible scaling of a multiport switch because the output port table width can be expanded while the output port index remains the same size.

DETAILED DESCRIPTION

Figure 3:
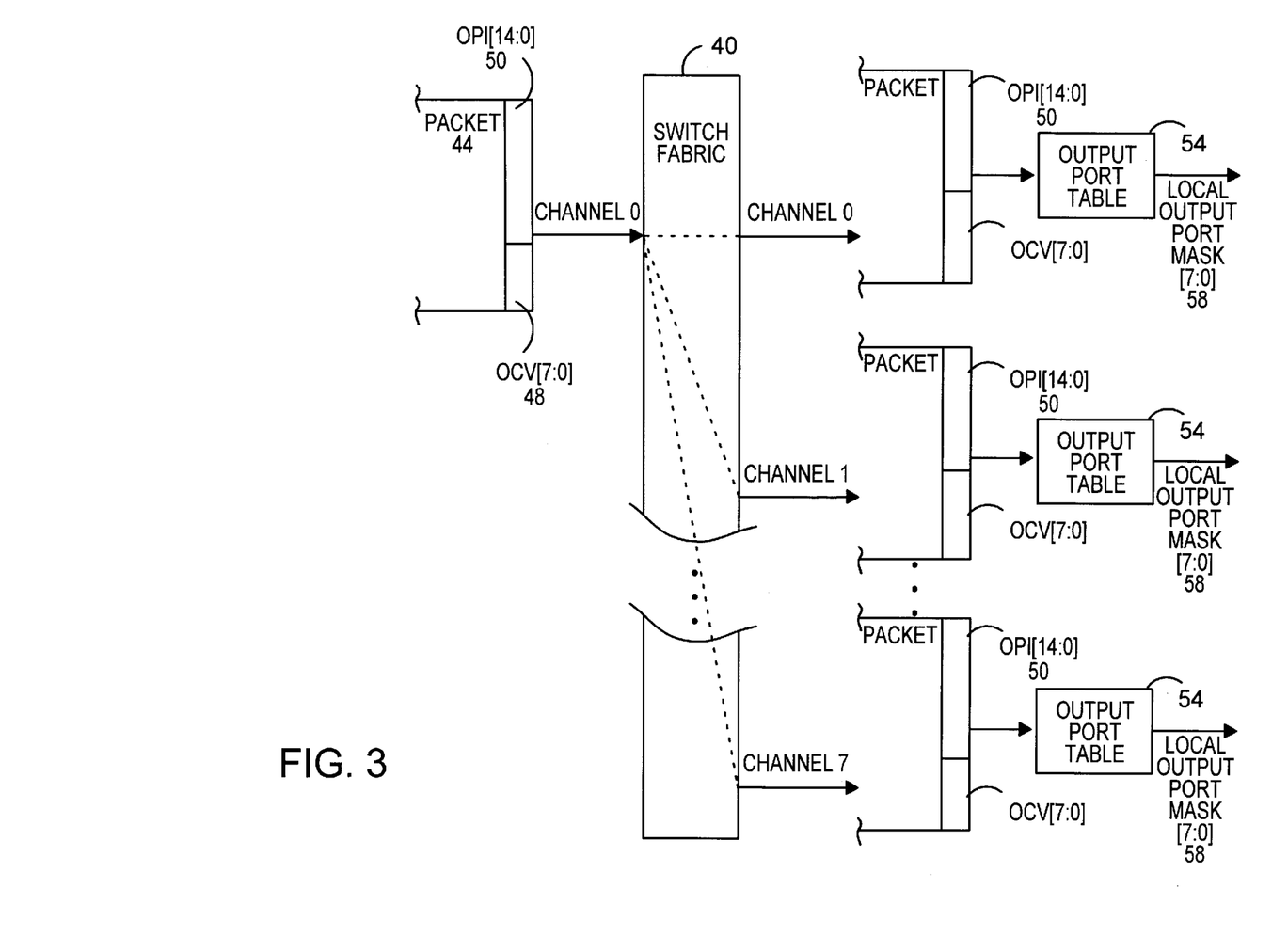
FIG. 3 is a depiction of a packet with an 8-bit output channel vector and a 15-bit output port index that is being forwarded through a switch fabric in accordance with the invention.

FIG. 3 is a block diagram that depicts the preferred system for identifying output ports and forwarding packets in a multiport switch. The block diagram shows a packet 44, on the input side of a 64×64 port switch having an 8×8 channel switch fabric 40 similar to the switch architecture of FIG. 1. The packet is incoming to the switch fabric on channel 0 from IPP 0 (not shown). The packet is to be multicast via output ports that are related to output channels 0, 1, and 7, where output channels 0, 1, and 7 are connected to respective OPPs 0, 1, and 7 (not shown).

One difference between the system of FIG. 3 and the system of FIG. 2 is that the headers attached to the packets on either side of the switch fabric include two portions. The first portion of each header is an output channel vector (OCV) 48 that identifies which output channel or output channels should receive the packet. Since there are eight output channels, the output channel vector is an 8-bit vector with one bit uniquely corresponding to each different output channel. The second portion of each header is an output port index (OPI) 50 that is used as an indicator to determine which output ports should receive the packet. In the preferred embodiment, the output port index is a 15-bit vector, but the exact number of bits in the vector is not critical to the invention.

Another difference between the system of FIG. 3 and the system of FIG. 2 is that there is an output port table 54 associated with each output channel. The eight output port tables keep an indexed list of 8-bit output vectors that represent output port combinations for packet transfers through the switch. The output vectors from the eight output port tables combine to create a 64-bit output vector. At the output side of the switch fabric 40, the output port index 50 is used to look-up the desired 8-bit output vectors in the indexed output port tables. The looked-up output vectors identify which output ports are to receive the switched packet and 8-bit local output port masks 58 are generated to direct packet delivery to each identified output port.

Since the output port index is fifteen bits, it can support $2^{15}$, or 32,768, different output vector and corresponding output port combinations. The different output port combinations are identified and packets are forwarded utilizing a combined vector that is twenty-three bits (eight bits from the OCV and fifteen bits from the OPI), as opposed to the prior art which requires a 64-bit output vector to identify the same number output port combinations and to forward packets.

Figure 4:
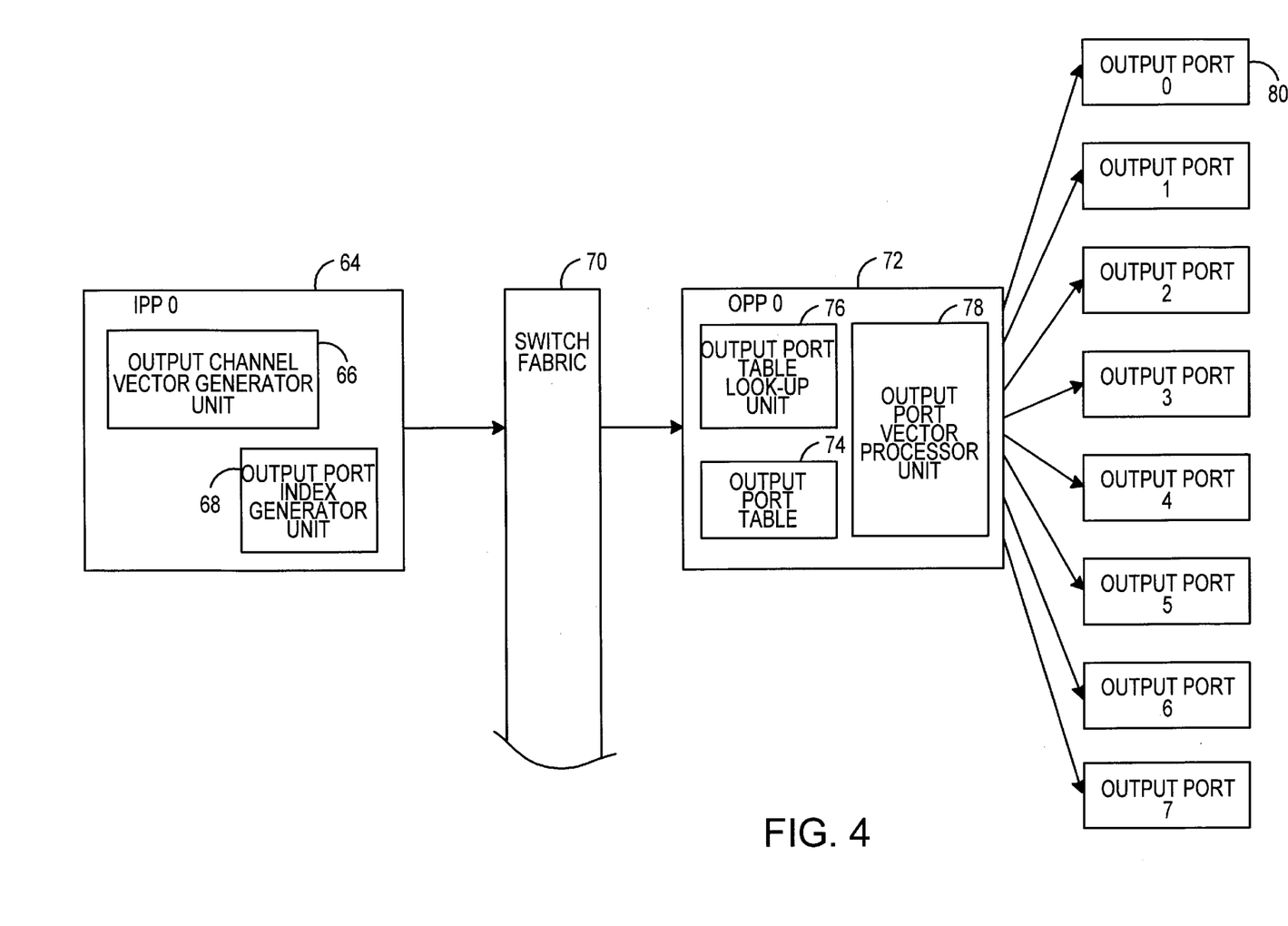
FIG. 4 is an expanded block diagram of the preferred architecture for one channel in a 64×64 port switch in accordance with the invention.

FIG. 4 is an expanded view block diagram of the preferred architecture for identifying ports and forwarding packets in accordance with the invention. The diagram shows only one out of eight channels and eight out of sixty-four output ports of a 64×64 port switch. The first element in the architecture is the input packet processor 64, IPP 0. In the 64×64 switch, the IPP receives packets from eight input ports (not shown), buffers the packets to accommodate for fluctuations in traffic, and directs packets to the switch fabric 70. The elements of importance for the IPP are the output channel vector generator unit 66 and the output port index generator unit 68. The output channel vector generator unit utilizes header information from an incoming packet to generate an output channel vector that defines which output channels will receive the incoming packet. In networks utilizing internet protocol (IP), source and destination information is used to generate the output channel vector. The output channel vector preferably has a width equal to the number of output channels in the switch, such that in the 8 channel preferred embodiment, the output channel vector is eight bits. Bits that are set to "1" identify channels that will receive a forwarded packet.

The output port index generator unit 68 also utilizes header information to generate a single output port index that allows an output port vector to be "looked-up" in a table. In networks utilizing IP, source and destination information is used to generate the output port index. In the preferred embodiment, the output port index is a 15-bit vector. A 15-bit vector allows for $2^{15}$ or 32,768 different output port index combinations and consequently enables the unique identification of 32,768 different 64-bit output vectors, where each output vector is identified by a unique index. Although in the preferred embodiment the output port index is fifteen bits, the exact width of the output port index is not critical to the invention. It should be noted that the same output port index is forwarded to all target OPPs and overhead savings are realized by limiting the width of the output port index to less than the total number of output ports in the switch.

Referring again to FIG. 4, the switch fabric 70 of the preferred embodiment is a conventional 8×8 physical switch that provides the paths for packet transfers. Although an 8×8 switch fabric is described, the exact number of channels is not critical to the invention. An exemplary alternative switch fabric has sixteen input channels and sixteen output channels.

The output packet processor 72, OPP 0, receives packets from the switch fabric 70 and is responsible for buffering and distributing the packets to the attached output ports 80. The elements of importance within the OPPs are the output port table 74, the output port table look-up unit 76, and the output port vector processor unit 78. The output port table, briefly described above, is an indexed table of output port vectors. The width of each output port vector stored within the output port table is preferably equal to the number of output ports connected to the OPP. For example, in the case where eight output ports are connected to the OPP, the output port vector is eight bits, or one byte. The number of output port vectors stored within the output port table can vary, but preferably the number of output port vectors stored in the output port table does not exceed the number of unique vector combinations that can be generated by the 15-bit output port index. If the number of output port vectors does not exceed the number of unique vector combinations of the output port index, then each output port vector can have a unique output port index. For example, in the preferred 64×64 switch, the 15-bit output port index allows 32,768 vector combinations and, therefore, the maximum number of 1-byte output port vectors stored in each output port table should not exceed 32,768.

Figure 5:
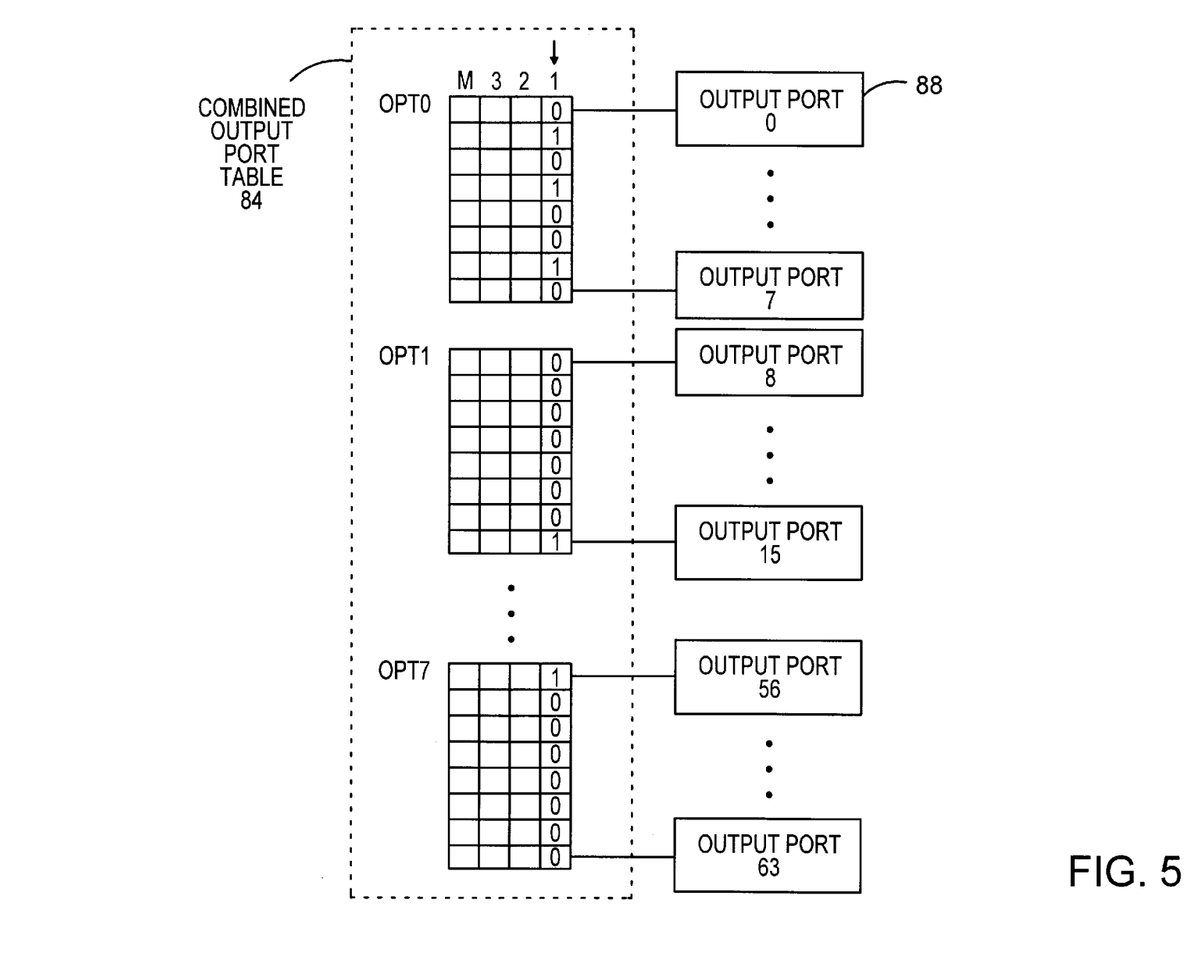
FIG. 5 is a depiction of the combined output port table for a 64 output port switch in accordance with the invention.

Although the output port table 74 is depicted in FIG. 4 as a stand-alone table, the output port table can be thought of as a continuous table that includes a bit for all of the output ports in the switch. Referring to FIG. 5, the combined output port table 84 (output port tables 0 through 7, OPT 0–OPT 7) is depicted as a single continuous table with register locations for output ports 0 through 63. Each 64-bit output port vector has a unique 15-bit output port index represented for description purposes at the top of the table as an arabic number, such as the numbers 1 through M. With a 15-bit exit port index, M is equal to 32,768.

An important feature of the output port tables 74 and 84 is that the output port table is dynamic. The output port table can be programmed to add output port vectors to the table based on, for example, time of use or frequency of use, and the output port table can be modified based upon information from the input side of the switch or the output side of the switch. One exemplary way of maintaining the output port table is to add output port vectors to the table based upon a history of the output port combinations requested by actual packets passing through the switch. New output port combinations are added to the output port table until the output port table reaches the maximum number of output port vectors. Once the output port table has stored the maximum number of output port vectors, the oldest output port vectors are replaced whenever a new output port combination is utilized by a packet. Alternatively, the output port vectors may be maintained by frequency of usage, where the output port vectors that are used most frequently are maintained in the output port table and the output port vectors that are used least frequently are replaced by more frequently utilized vectors.

Referring back to FIG. 4, the next element in the architecture is the output port table look-up unit 76. The output port table look-up unit performs the function of obtaining the output port index from a packet and utilizing the output port index to look-up the related output port vector in the output port table 74. The advantage of using an output port index to identify an output port vector is that an entire output port vector, for example a 64-bit output port vector, can be identified by forwarding only one 15-bit vector through the switch fabric 70. An example of the look-up process is depicted in FIG. 5. When the output port index identifies, for example, the index number "1," highlighted by the pointer, the entire 64-bit output port vector stored in the same column of the combined output port table is accessed. The 64-bit output port vector has set bits related to each output port 88 that is to receive a packet. In a unicast only one bit will be set, whereas in a multicast multiple bits will be set.

The next element in the preferred architecture is the output port vector processor unit 78. The output port vector processor unit is responsible for utilizing the output port vector that is accessed from the output port table 74 to forward packets to the appropriate output ports 80. For example, referring to FIG. 5, if the output port vector with index number "1" has bits set for output ports 1, 3, 6, 15, and 56, then the respective output port vector processor units 78 will generate respective local output port masks. The output port vector processor units will replicate the outgoing packet, where multicasts are required, and forward the packets to output ports 1, 3, 6, 15, and 56. The output port vector processor units manage packet forwarding only for packets in their respective switch channels.

Although in the preferred architecture the different function-specific units are described as being physically located within the IPPs and OPPs, the different function-specific units can have other physical locations and still perform the same function.

Figure 6:
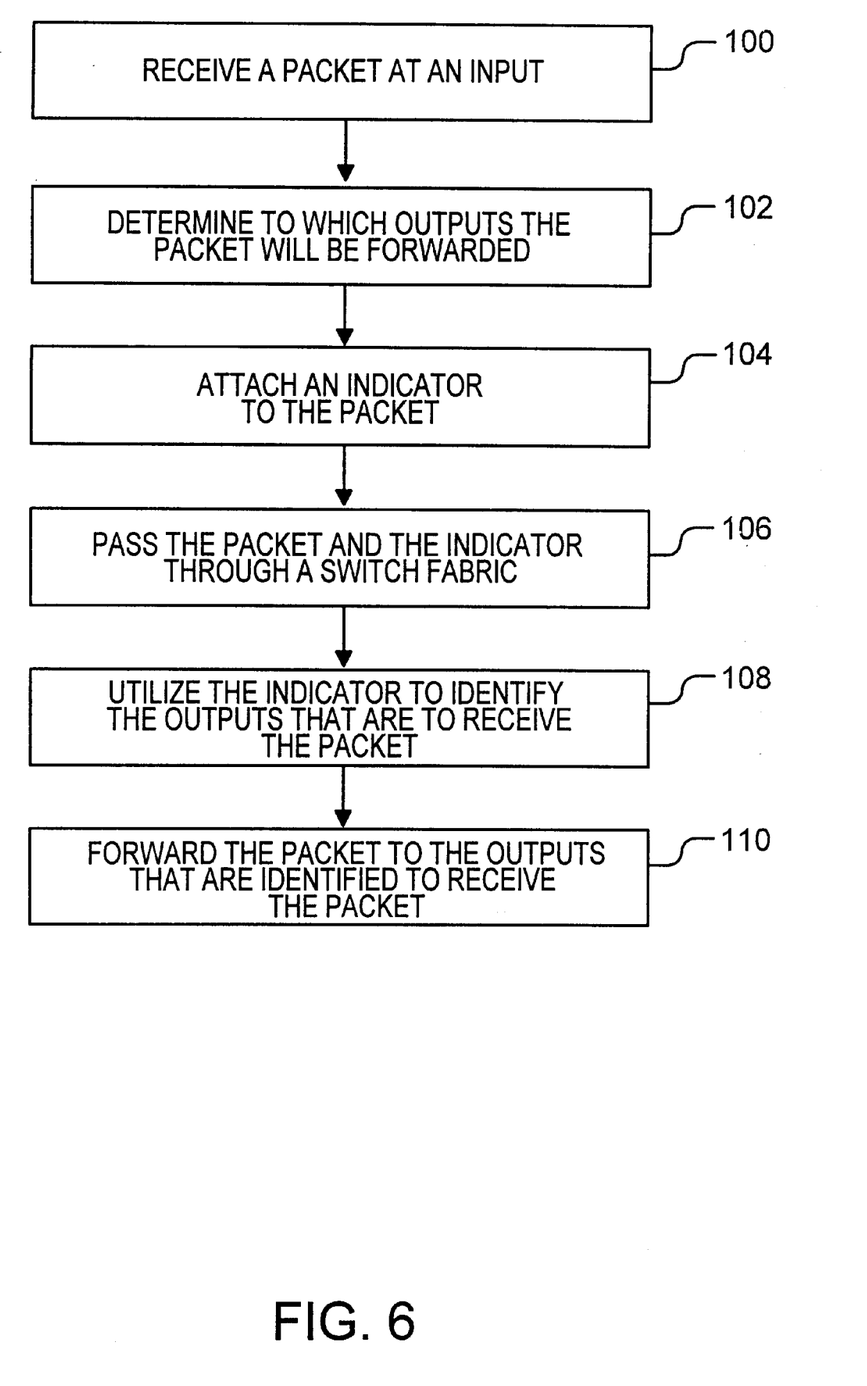
FIG. 6 is a flow diagram of a method for forwarding packets to target output ports in accordance with the invention.

A method for forwarding packets to target output ports in a switch having multiple output ports is described with reference to FIG. 6. The first step 100 in the method involves receiving a packet at an input, preferably an IPP 64 equipped with an output channel vector generator unit 66 and an output port index generator unit 68. The next step 102 involves the IPP determining to which outputs the packet will be forwarded. After the target outputs are determined, in step 104, an indicator is attached to the packet that enables subsequent identification of the output vector, which specifies the target output ports for receiving the packet. In the preferred embodiment, step 104 involves attaching an 8-bit output channel vector and a 15-bit output port index to the packet. In step 106, the packet and the attached indicator are passed through the switch fabric. In step 108, the indicator attached to the packet is utilized to identify the output vector for the packet. In a preferred embodiment, the 15-bit output port index is utilized to look-up the output vector in a table. Typically, the output port index and the packet have completely passed through the switch fabric and into an OPP before step 108 begins, although step 108 can begin as soon as the output port index passes through the switch fabric, but before completion of the passage of the payload portion of the packet. In a last step 110, the packet is forwarded to the outputs that are identified by the output vector. Optionally, the output vector obtained from the look-up table is attached to each forwarded packet to enable further routing.

Figure 7:
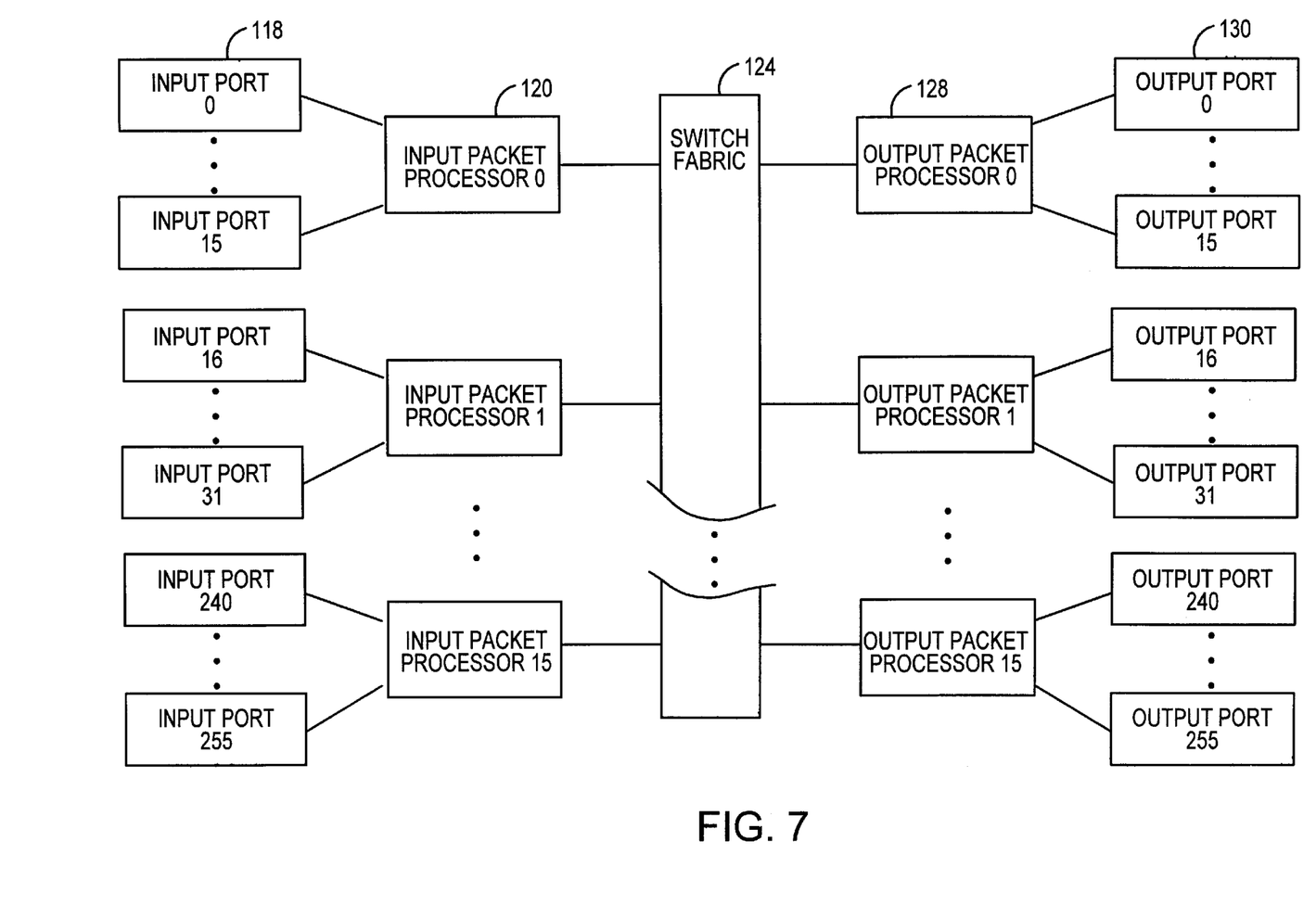
FIG. 7 is a block diagram of the architecture of a 256×256 port switch that is utilized in accordance with the invention.

In accordance with the invention, additional bandwidth savings are realized when the number of ports on a multiport switch is increased. Since a single index is used to represent all output port combinations, a switch can be scaled up without needing to change the size of the output port index. For example, FIG. 7 depicts a 256 input port 118 by 256 output port switch 130 having sixteen input packet processors 120, a switch fabric 124, and sixteen output packet processors 128. In accordance with the prior art, a 256-bit output vector would be assigned to each packet incoming to one of the sixteen IPPs. The 256-bit vector would then be forwarded through the switch fabric with each packet that is forwarded through the switch fabric, thereby adding a significant volume of traffic through the switch fabric. In contrast, in a 256×256 port switch utilizing the output port identification method in accordance with the invention, a 31-bit output vector consisting of a 16-bit output channel vector and 15-bit output port index or indicator is utilized to accomplish the same result.

The architectural changes required in accordance with the invention to accommodate the addition of new output ports onto an existing switch consists of adding fields to the output port table while maintaining the size of the output port index constant. Referring back to FIGS. 4 and 5, if new output ports 64 through 255 are added to the 64 output port switch to create the 256-port switch in FIG. 7, new fields are added to the combined output port table 84 such that the new combined output port table is 256 bits wide, but the same 15-bit output port index is still able to identify 32,768 output port vectors. In contrast, a prior art switch would require that the output vector passing through the switch fabric be changed from 64-bits to 256-bits.

In an alternative embodiment of the invention, the output port index technique can be used to perform other operations in a similar manner with similar flexibility and overhead savings. For example, filtering of multicasts at the output side of the switch can be accomplished using a supplemental index and a supplemental look-up table that contains output-specific information.

Figure 8:
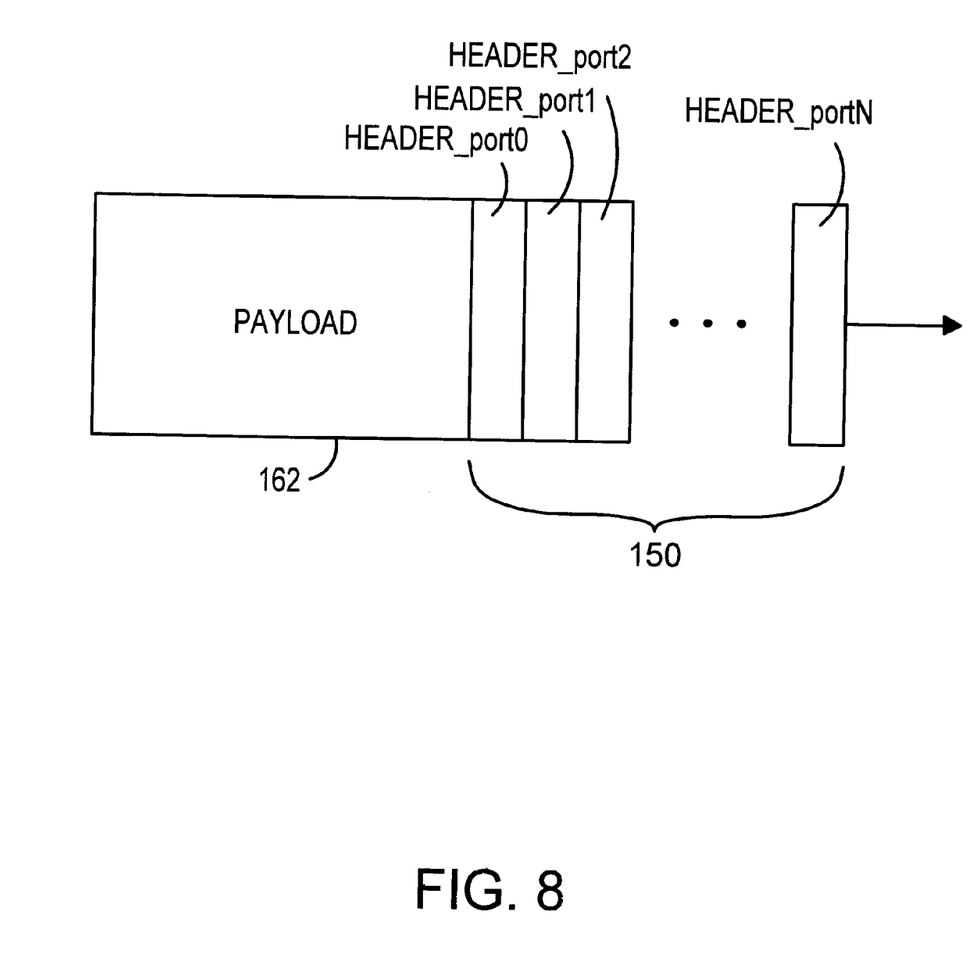
FIG. 8 is a depiction of a packet with multiple unique headers in accordance with the invention.

In another alternative embodiment of the invention, when a multicast packet is being sent to output ports that are communicating with devices that use different communications protocols, packet headers must be modified to conform to the respective protocols. Supplemental indexed look-up tables can be used to identify which communications protocols must be supported. Referring to FIG. 8, the OPP uses a supplemental look-up table to identify port-specific headers 150 and then sends each individual port-specific header to its respective output port. The payload 162 portion of the packet is then sent to the respective output ports simultaneously.

What is claimed is:

1. A method for forwarding packets to target outputs in a switch having a plurality of outputs and a switch fabric comprising the steps of:

receiving a packet at an input, said packet having header information indicative of each target output to which said packet is to be forwarded, said header information having a first bit width;

stripping said header information from said packet;

attaching an indicator to said packet that enables subsequent identification of said target outputs, said indicator having a second bit width less than said first bit width;

passing said packet and said attached indicator through a switch fabric;

utilizing said indicator to identify said target outputs; and forwarding said packet to each said target output.

2. The method of claim 1 wherein said step of attaching said indicator includes identifying a location in a look-up table representative of a plurality of potential combinations of outputs, said step of utilizing said indicator including accessing said look-up table after said attached indicator has passed through said switch fabric.

3. The method of claim 1 wherein said step of attaching an indicator includes a step of attaching an output channel vector indicative of output channels operatively associated with said target outputs and includes attaching an output port index configured to enable said step of utilizing said indicator to identify said target outputs.

4. The method of claim 1 wherein said step of utilizing includes steps of:

accessing a look-up table that contains a plurality of output vectors for which each output vector represents a selected number of said outputs; and matching said indicator to a particular output vector in said look-up table to identify outputs represented in said particular output vector as said target outputs to which said packet is to be forwarded.

5. The method of claim 4 further comprising a step of selectively reconfiguring said switch to enable access to added outputs, including providing substeps of:

adding fields to said look-up table to correspond to said added outputs;

maintaining said indicator at said second size utilized before said added outputs were accessible by said switch.

6. The method of claim 4 wherein said step of passing said packet is a step of passing a single copy of said packet through said switch fabric regardless of the number of said target outputs to which said packet is to be forwarded.

7. A system for identifying output ports and for routing packets in a multiport switch having a switch fabric that links a plurality of input ports to a plurality of output ports comprising:

an output port table having registers that store an index of output vectors, each output vector being indicative of at least one output port;

means, operatively associated with said input ports, for generating an indicator that relates to a specific output vector stored in said output port table for each packet before said each packet is transmitted through said switch fabric, said generated indicator being based upon target output ports of said each packet;

means for forwarding said each packet and said generated indicator through said switch fabric;

means, operatively associated with said output ports, for using said forwarded indicator generated for said each packet to access said specific output vector stored in said output port table; and means for forwarding said packet to all output ports indicated by said specific output vector.

8. The apparatus of claim 7 wherein said output port table stores output vectors having a number of bits that is equal to the number of output ports in said multiport switch, each bit being specific to one of said output ports.

9. The apparatus of claim 7 wherein said means for generating an indicator includes circuitry that outputs said indicator in a fixed number of bits.

10. The apparatus of claim 9 wherein said circuitry outputs said indicator in a fixed number of bits that is less than the number of said output ports in said switch.

11. The apparatus of claim 10 wherein said output port table has a maximum number of said registers for storing output vectors, said maximum number being equal to $2^{FN}$, where FN is equal to said fixed number of bits in said indicator.

12. The apparatus of claim 7 further including means for performing per port filtering by utilizing a supplemental table and a supplemental indicator attached to said packet.

13. The apparatus of claim 7 wherein said means for generating an indicator is located within an input port processor circuit and wherein said output port table, said means for using said forwarded indicator, and said means for forwarding said packet are all located within an output packet processor.

14. A method for identifying output ports and forwarding packets to identified output ports in a switch having a plurality of output ports and a switch fabric comprising the steps of:

maintaining an output port table that stores output vectors that represent possible output port combinations for forwarding packets to output ports of said switch, wherein each output vector has a unique identification in memory;

assigning one of said identifications to a first packet before said first packet passes through said switch fabric;

passing said first packet and said assigned identification through said switch fabric;

matching said assigned identification with a specific output vector stored in said output port table; and forwarding said first packet to each of the said output ports that is represented in said specific output vector.

15. The method of claim 14 wherein said step of matching occurs only after said first packet and said assigned identification are passed through said switch fabric.

16. The method of claim 14 wherein said step of maintaining said output port table includes a step of updating said output port table based on actual output port utilization information.

17. The method of claim 14 wherein said step of maintaining said output port table includes a step of updating said output port table based on information received from said output ports.

18. The method of claim 14 further including the steps of:

maintaining a supplemental table that includes port-specific filtering information;

assigning a supplemental index to said first packet;

matching said assigned supplemental index to an index of said supplemental table to obtain said port-specific filtering information; and forwarding said first packet in accordance with said supplemental filtering information.

19. The method of claim 14 further including the steps of:

maintaining a supplemental table that includes protocol-specific header information;

assigning a supplemental index to said first packet;

matching said assigned supplemental index to an index of said supplemental table to obtain said protocol-specific header information; and modifying a header of said first packet in accordance with said protocol-specific header information.

20. The method of claim 14 wherein said step of forwarding includes steps of:

generating protocol-specific packet headers related to each of said output ports that is identified by said obtained output vector;

forwarding said protocol-specific headers to respective output port controllers; and transmitting said packet simultaneously to all of said output port controllers that receive said protocol-specific headers.

* * * * *